Oct. 17, 1950     T. CROCELLA     2,526,460
ILLUMINATED LICENSE PLATE HOLDER
Filed May 7, 1948
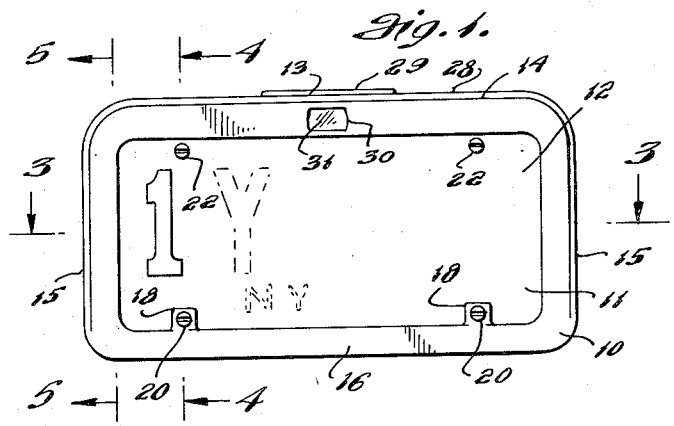
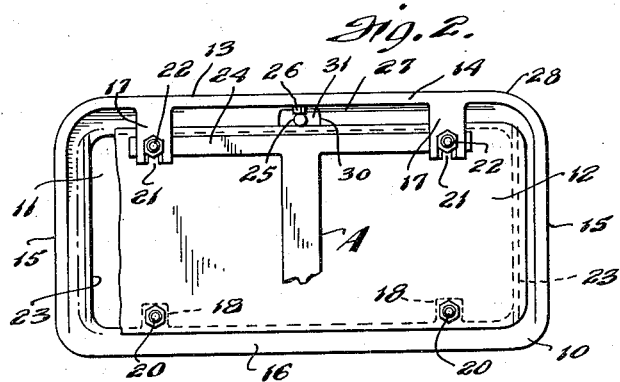
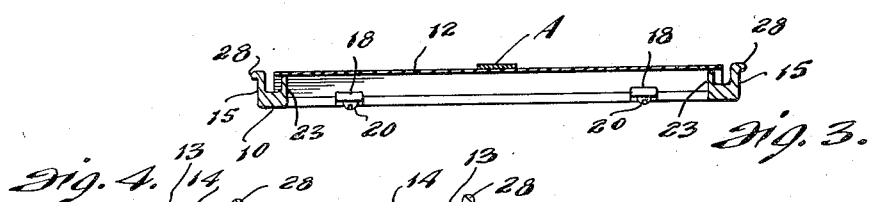
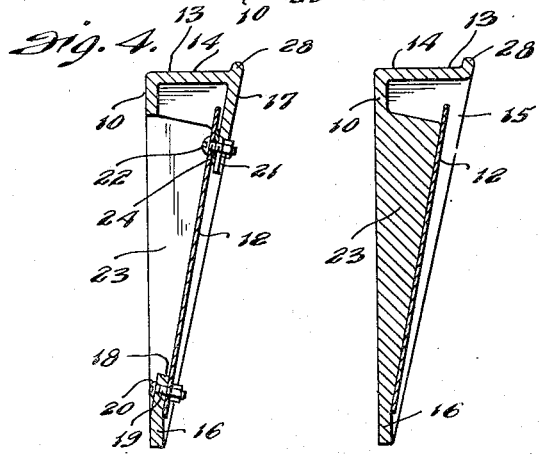
INVENTOR.
THOMAS CROCELLA
BY
Clark & Alt
ATTORNEYS Patented Oct. 17, 1950

2,526,460

UNITED STATES PATENT OFFICE 2,526,460

ILLUMINATED LICENSE PLATE HOLDER

Thomas Crocella, New York, N. Y.

Application May 7, 1948, Serial No. 25,573

3 Claims. (Cl. 40—130)

This invention relates to an illuminated license plate holder for automotive vehicles.

The invention has for an object to provide a holder of rectangular formation for receiving and mounting a license plate in recessed relation from the forward face thereof.

Another object of the invention is to provide a holder of said character in which the license plate is supported in inclined relation in order to render the same clearly visible at a distance when the plate is illuminated.

Still another object of the invention is the provision of a license plate holder which is of integral formation and may be made as a stamping or casting.

Still another object of the invention is the provision of a license plate holder having means for uniformly illuminating the forward face of the license plate.

With the foregoing and other objects in view, reference is now made to the following specification and accompanying drawings in which the preferred embodiment of the invention is illustrated.

In the drawings:

Fig. 1 is a front view of a license plate holder constructed in accordance with the invention and illustrating the license plate in position therein.

Fig. 2 is a rear view thereof illustrating the license plate partly broken away and the holder secured to a T-shaped frame for mounting the same on a vehicle.

Fig. 3 is a horizontal sectional view taken approximately on line 3—3 of Fig. 1.

Fig. 4 is an enlarged vertical sectional view taken approximately on line 4—4 of Fig. 1.

Fig. 5 is a similar view taken approximately on line 5—5 of Fig. 1.

Referring to the drawings by characters of reference, the holder is preferably of integral construction and is arranged for mounting the license plate in inclined relation so that a light located within the holder above the plate will illuminate the same to render it visible from a distance while the light will be hidden from view.

The holder includes a rectangular frame 10 having a rectangular opening 11 through which the license plate 12 is visible when mounted in the holder. The frame 10 forms the front wall of the holder and is provided with a housing 13 which forms the top wall 14 and opposite side walls 15 thereof and within which the plate 12 is mounted for disposing the same at the rear of the opening 11. The housing 13 extends rearwardly from the upper edge and opposite side edges of the frame in right angular relation with the plane of the frame. The opposite side walls 15 thereof taper from the top wall 14 to the bottom of the frame so as to form triangular shaped side walls.

In order to provide means for supporting the license plate 12 in angular relation with reference to the plane of the frame 10, the top wall 14 of the housing and the bottom portions 16 of the frame are formed with inwardly and angularly directed pairs of upper and lower tongues 17 and 18 which are respectively spaced apart a distance corresponding to the spacing of the openings in the license plates adjacent the top and bottom edges thereof. The lower tongues 18 project inwardly from the inner edge of the bottom portion 16 and are apertured as at 19 for receiving bolts 20 for securing the license plate against the rear faces thereof while the upper tongues 17 extend inwardly from the rear of the top wall 14 and are slotted as at 21 for receiving bolts 22 for securing the license plate against the forward faces thereof. The housing also includes triangular shaped walls 23 which project rearwardly from the inner edges of the frame 10 at the opposite ends thereof in parallel relation with the side walls 15. The walls 23 taper from the top to the bottom thereof in corresponding relation with the side walls 15 and are somewhat narrower than said side walls so that the side edge portions of the license plate engage against the rear edges thereof when mounted on the tongues 17 and 18.

The holder is adapted to be mounted on a vehicle in any desired manner such as by the usual T-shaped bracket A affixed at its lower end to the frame of the vehicle (not shown) and having an apertured top bar 24 secured by the bolts 22 between the tongues 17 and the license plate 12.

This positions the holder with the frame 10 disposed in a vertical plane and the license plate 12 at an angle thereto so that a light bulb 25 mounted in a socket 26 secured to the top wall 14 will illuminate the face of the plate.

The socket 26 is adapted to be connected in an electric circuit by the conductor wires 27 which extend along the top wall 14. The housing 13 is formed with a bead 28 extending about the periphery thereof and the upper edge of the frame 10 may be provided with a plane surface 29 for a name plate.

The holder may be made of synthetic plastic, metal and the like and if made of a synthetic plastic it is preferably of a transparent or translucent material, red in color, so that light from the bulb 25 will be seen as red colored rays therethrough. In the event that the holder is made of metal, the forward face thereof is preferably formed with an opening 30 in which is arranged a transparent or translucent panel 31 of red glass or synthetic plastic material so that the bulb 25 will throw a red light therethrough which serves as a warning light.

What is claimed is:

1. In a vehicle license plate holder, a rectangular frame defining the front wall of the holder and having a rectangular shaped opening through which the license plate is visible when mounted in the holder, a housing integrally connected with said frame along the top and opposite ends thereof and extending rearwardly therefrom in right angular relation with the front wall of the holder to thereby define the top wall and opposite end walls of the holder, said end walls tapering from the top wall to the bottom of the frame, pairs of apertured tongues extending inwardly from the lower portion of said frame and from the rear of the top wall of the housing in aligned inclined relation beyond the opening in said frame, bolts engaging through the apertures in said tongues and through apertures in the license plate for attaching the plate to said tongues at the rear of said opening in inclined relation with reference to the plane of the frame, triangular shaped walls formed integrally with said rectangular frame and extending inwardly from the inner edges of the frame bordering said opening at the opposite ends thereof against which the ends of the license plate engage, and an electric light located within said housing rearwardly of the top of the frame adapted to illuminate the face of the license plate.

2. In a vehicle license plate holder, a transparent colored rectangular frame defining the front wall of the holder and having an opening through which the license plate is visible when mounted in the holder, a housing connected with said frame along the top and opposite ends thereof and extending inwardly therefrom to thereby define the top wall and opposite end walls of the holder, a pair of apertured tongues extending inwardly from the lower portion of said frame beyond the opening therein in inclined relation with reference to the plane of the frame, a pair of slotted tongues extending inwardly from the rear of the top wall of the housing beyond the opening in said frame in inclined relation corresponding to that of said first mentioned tongues, bolts engaging through the apertures and slots in said tongues and through apertures in the license plate for attaching the plate to said tongues at the rear of said opening in inclined relation with reference to the plane of the frame, walls extending inwardly from the inner edges of the frame bordering said opening at the opposite ends thereof against which the ends of the license plate engage, and an electric light located within said housing rearwardly of the top of the frame adapted to illuminate the face of the license plate.

3. In a vehicle license plate holder, a rectangular frame defining the front wall of the holder and having a rectangular shaped opening through which the license plate is visible when mounted in the holder, a housing connected with said frame along the top and opposite ends thereof and extending rearwardly therefrom in right angular relation with the front wall of the holder to thereby define the top wall and opposite end walls of the holder, said end walls tapering from the top wall to the bottom of the frame, pairs of apertured tongues extending inwardly from the lower portion of said frame and from the rear of the top wall of the housing in aligned inclined relation beyond the opening in said frame, bolts engaging through the apertures in said tongues and through apertures in the license plate for attaching the plate to said tongues at the rear of said opening in inclined relation with reference to the plane of the frame, and triangular shaped walls extending inwardly from the inner edges of the frame bordering said opening at the opposite ends thereof against which the ends of the license plate engage.

THOMAS CROCELLA.

REFERENCES CITED

The following references are of record in the file of this patent:

UNITED STATES PATENTS

| Number | Name | Date |
|---|---|---|
| 1,080,631 | Havemeyer | Dec. 9, 1913 |
| 1,383,978 | Brewster | July 5, 1921 |
| 1,621,582 | Collamore | Mar. 22, 1927 |
| 2,128,679 | Kielian | Aug. 30, 1938 |
| 2,167,791 | Wyatt | Aug. 1, 1939 |
| 2,194,042 | Wyatt | Mar. 10, 1940 |
| 2,349,703 | Carlin | May 23, 1944 |
| 2,361,479 | Joffo | Oct. 31, 1944 |
| 2,454,722 | Slamka | Nov. 23, 1948 |